March 16, 1965   H. W. TREVASKIS   3,173,821
PLY TURNING DEVICE FOR USE IN THE MANUFACTURE
OF PNEUMATIC TYRES
Filed Dec. 9, 1959   2 Sheets-Sheet 1
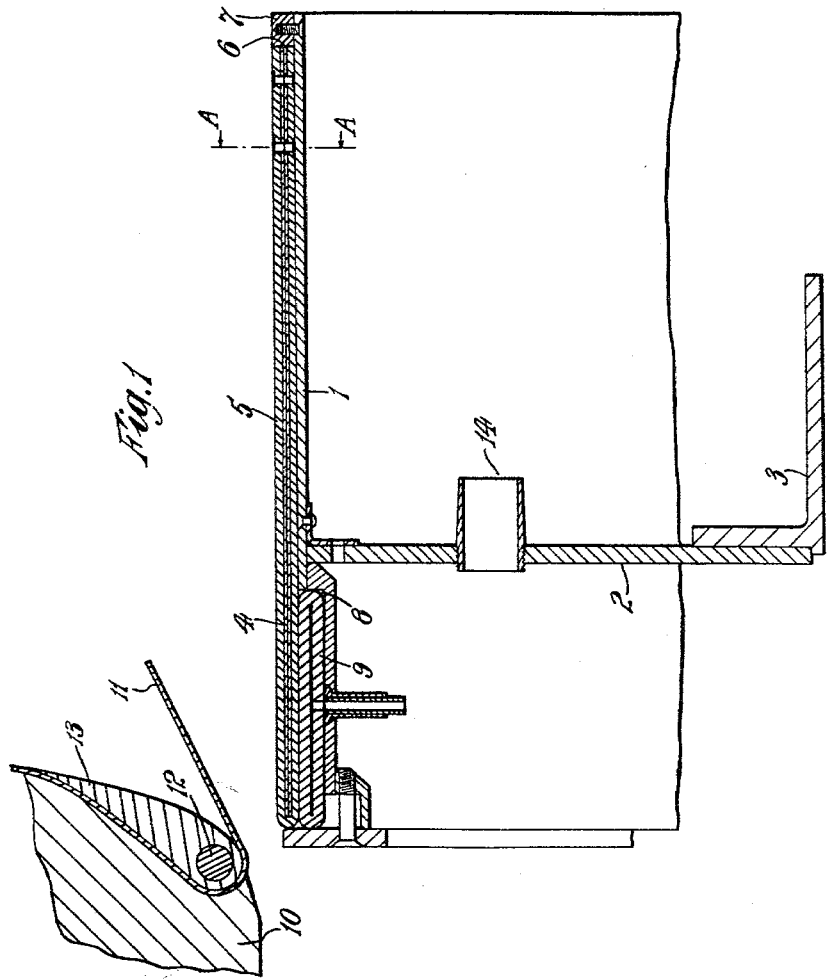
INVENTOR
Henry William Trevaskis
by Benj. T. Rauber
his attorney

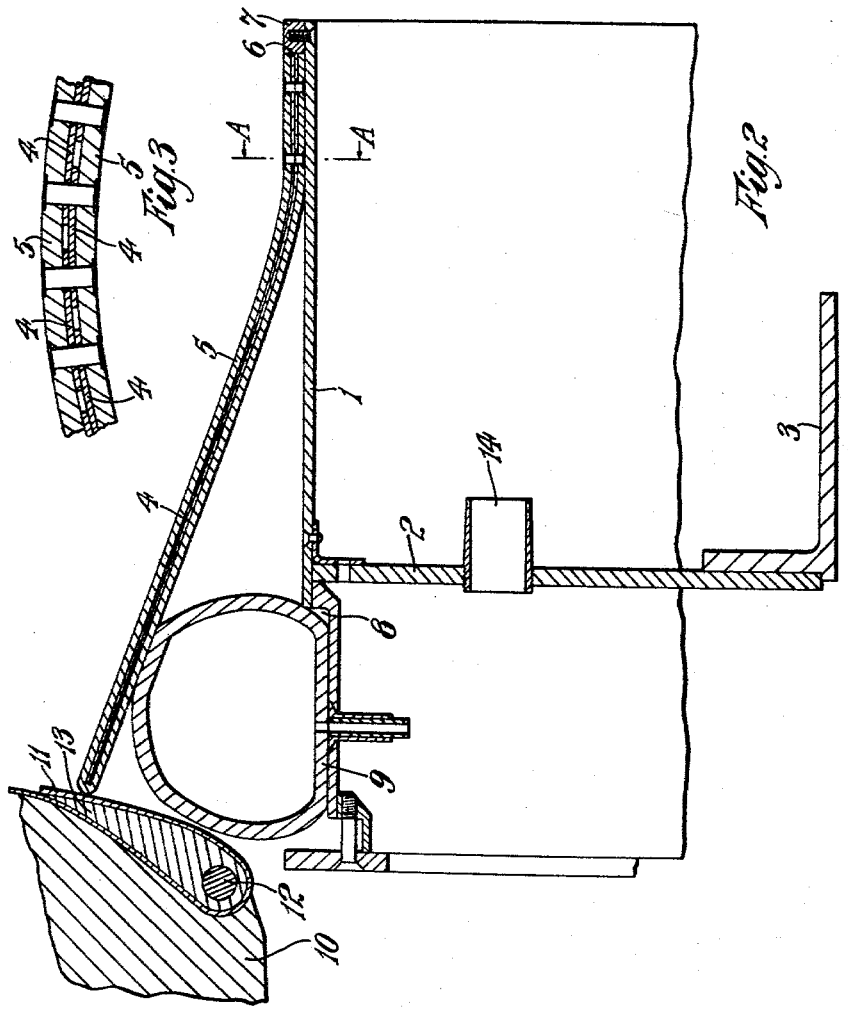

3,173,821
PLY TURNING DEVICE FOR USE IN THE MANUFACTURE OF PNEUMATIC TYRES
Henry William Trevaskis, Point Pleasant, Blackdown, near Leamington Spa, England, assignor, by mesne assignments, to Dunlop Tire and Rubber Corporation, Buffalo, N.Y., a corporation of New York
Filed Dec. 9, 1959, Ser. No. 858,536
2 Claims. (Cl. 156—401)

This invention relates to a ply turning device for use in the manufacture of pneumatic tyres, that is to say a device for use in turning the side portions of tyre carcass plies down the sides of crown formers upon which partially shaped tyre carcasses are built, or for turning the plies up around the bead wires. Normally a tyre building former is rotatable about its central axis which is stationary and plies are turned by a device such as a roller engaging a ply on the former at one point on its periphery and the former is then rotated so that the roller rolls around the whole periphery. The present invention is applicable to a tyre building apparatus in which the former is stationary during the turning operation. An example of such apparatus is described in my co-pending application Serial No. 849,200, filed October 28, 1959, now U.S. Patent No. 2,997,095.

According to the present invention a ply turning device comprises a plurality of stiff but flexible fingers arranged in side-by-side relation and connected each by one end, around a circular mounting so that they define a substantially cylindrical surface coaxially extending from the mounting, mountable coaxially alongside a tyre building former with their free ends directed towards it, and means for flexing the fingers radially whereby their ends may be adjusted to any desired radius within a predetermined range and caused to engage the side region of a ply on the former and turn it across the side of the former.

One embodiment of the invention will now be described, by way of example, with reference to the accompanying drawings in which:

FIGURE 1 is a fragmentary transverse section of apparatus for turning plies in the manufacture of a pneumatic tyre.

FIGURE 2, a similar section to FIGURE 1, shows the apparatus during a ply turning operation.

FIGURE 3, a fragmentary section on line A—A of FIGURES 1 and 2, drawn to a somewhat larger scale, shows the construction of the fingers.

The ply turning device comprises a substantially cylindrical mounting member 1 as shown in FIGURE 1 of diameter somewhat less than the bead diameter of the tyre which is to be built. A radial flange 2 extends inwardly from the member 1, intermediate its two ends, and carries a cylindrical central bearing sleeve 3 for slidably mounting the apparatus coaxially on the axial shaft of a tyre building former. Around the periphery of the member 1 are positioned a plurality of blade-like spring steel fingers 4 extending substantially longitudinally along its surface and sheathed within an annular bag 5 of tough abrasion resisting rubber, the bag being of length equal to the fingers. The bag has a mouth 6 at one end of the mounting member 1, and the ends of the fingers near to its mouth are riveted to it. As shown in FIGURE 3, the fingers are disposed in two annular layers in overlapping relation, the adjacent fingers in each layer being spaced apart a distance less than the width of a finger, and the fingers in the top layer are mounted over the spaces of the bottom layer so that the fingers define between them a continuous substantially cylindrical surface within the bag which is a close sliding fit on the mounting member 1. Rivets are passed through the overlapping parts of adjacent fingers, and the inner and outer layers of the bag, so as to connect the whole finger assembly together in the form of a sleeve to fit over the mounting member 1. An abutment ring 7 is secured to the end of the mounting member, for engagement by the riveted end of the bag so as to locate it in position. The mounting member is of length slightly greater than that of the fingers 4 and the bag 5 and at its end opposite to that carrying the abutment ring 7 has an annular recess 8 within which is received an inflatable tube 9 in closed annular form. In its deflated condition, as shown in FIGURE 1, the tube lies freely in the recess below the bag and the fingers. On inflation, however, the tube expands radially outwardly forcing the closed end of the bag 5 and the free ends of the fingers 4 out with it and flexing the fingers. The diameter of the closed end of the bag can thus be controlled and varied as desired by inflating the tube.

In use of the apparatus for turning a ply down over the shoulders of a crown former or for turning a ply up over the bead wire, the apparatus is first coaxially and slidably mounted on the shaft of a tyre building former 10. For a ply turning down operation a ply 11 is first mounted on the former and the side regions of the ply are turned down slightly by hand. The tube 9 is inflated until the free ends of the fingers 4 are moved radially outwardly to a radius substantially that of the shoulder of the former. The device is then moved axially towards the former until the fingers engage the ply at the shoulder and lie radially outwardly from it. The device is then reciprocated between successive positions on the former shaft causing the free ends of the fingers to be alternately pressed in engagement with and moved just clear of the ply. Each time the device is moved axially away from the former the tube 9 is deflated slightly so that it next engages the ply at successively decreasing radii, so pressing it progressively and smoothly down the side of the former. The rubber bag 5, sheathing the steel fingers 4, prevents any damage being done to the plies by their ends.

After the ply has been turned down as described or by some other means, the device (if used) is withdrawn and a bead wire 12 and fillers 13 are placed in position if required. The ply is then turned up around the bead wire a slight degree by hand and the device is again moved axially inwardly towards the former with the tube 9 inflated sufficiently for the free ends of the fingers to lie at a radius just greater than that of the bead wire. The free ends of the fingers engage the ply and press it axially inwardly against the filler strip 13. The device is then reciprocated as before and the tube 9 is inflated slightly each time the bag 5 and the fingers are clear of the ply, so as to increase the effective radius of the free ends of the fingers. The ply is thus turned over the bead wire and progressively consolidated radially outwardly up the side of the former to produce a smooth turn up as shown in FIGURE 2.

Instead of mounting the fingers at the minimum radius of the range or movement of their ends, they may instead be mounted inside a cylindrical member of the maximum radius of this range, and surrounded by an inflatable tube within the cylindrical member, on inflation of which the ends of the fingers will be flexed inwardly. In any embodiment using such resilient fingers it is necessary only that the fingers should be mounted either at the maximum or minimum radius of the desired range of movement, and be sufficiently flexible for their ends to reach the minimum or maximum radius, respectively.

One means of axially moving and reciprocating the device is a vacuum operated collapsible bellows as described in my co-pending application Serial No. 853,627, filed November 17, 1959, now U.S. Patent No. 3,058,721. For this purpose the radial flange 2 of the cylindrical member 1 is machined flat on its side which will be adjacent the former and has a connection 14 for a vacuum pipe. The collapsible bellows is slipped on the shaft before the present turning device and when the latter is placed in position the flat surface of the radial flange engages the end of the bellows. By applying a vacuum to the pipe connection in the flange the bellows can be caused to collapse so as to move the turning device axially towards the former. A spring is preferably mounted within the bellows for expanding it when the vacuum is released so as to move the turning device away from the former.

Having now described my invention, what I claim is:

1. A ply turning device for use in the manufacture of pneumatic tyres comprising a cylindrical mounting element, a plurality of stiff fingers each mounted at one end on said mounting element equidistant from a center of said mounting element and arranged in two co-axial layers, the fingers of each layer being in equally spaced side-by-side relation and overlapping the spaces of the other layer to form a substantially continuous hollow wall of circular cross section extending from said mounting element with the free ends of the fingers in a plane transverse to the axis of the wall, said fingers having sufficient flexibility and elasticity to flex radially about their mounting on said mounting element to change the diameter of the hollow body at the free ends of the fingers and to return to normal position upon the withdrawal of said force, and means contacting said fingers on a circumferential zone spaced from the free ends of said fingers and acting on said fingers in a direction radial to the axis of the wall to flex said fingers equally in a radial direction to a radial selected position.

2. A ply turning device for use in the manufacture of pneumatic tyres comprising a cylindrical mounting element, a plurality of stiff fingers each mounted at one end on said mounting element equidistant from a center of said mounting element and arranged in a series to form a substantially continuous hollow wall of circular cross section extending from said mounting element with the free ends of the fingers in a plane transverse to the axis of the wall, said fingers having sufficient flexibility and elasticity to flex radially about their mounting on said mounting element to change the diameter of the hollow body at the free ends of the fingers and to return to normal position upon the withdrawal of said force, and an inflatable annular tube interposed between the fingers adjacent their free ends whereby on inflation of the tube the free ends are urged radially away from the cylindrical member.

References Cited by the Examiner

UNITED STATES PATENTS

| | | | |
|---|---|---|---|
| 1,562,754 | 11/25 | Gautier | 154—10.4 |
| 1,759,232 | 5/30 | Gammeter | 154—10.3 |
| 1,790,210 | 1/31 | Gammeter | 154—10.3 |
| 2,653,645 | 9/53 | Frazier | 154—9 |
| 2,743,760 | 5/56 | Beckadolph | 154—9 |

EARL M. BERGERT, *Primary Examiner.*

CARL F. KRAFFT, *Examiner.*